(12) United States Patent
Shabtay et al.

(10) Patent No.: US 11,614,635 B2
(45) Date of Patent: *Mar. 28, 2023

(54) THIN DUAL-APERTURE ZOOM DIGITAL CAMERA

(71) Applicant: Corephotonics Ltd., Tel Aviv (IL)

(72) Inventors: Gal Shabtay, Tel Aviv (IL); Ephraim Goldenberg, Tel Aviv (IL)

(73) Assignee: Corephotonics Ltd., Tel Aviv (IL)

( * ) Notice: Subject to any disclaimer, the term of this patent is extended or adjusted under 35 U.S.C. 154(b) by 0 days.

This patent is subject to a terminal disclaimer.

(21) Appl. No.: 17/665,498

(22) Filed: Feb. 5, 2022

(65) Prior Publication Data

US 2022/0171211 A1 Jun. 2, 2022

Related U.S. Application Data

(63) Continuation of application No. 16/812,289, filed on Mar. 7, 2020, now Pat. No. 11,287,668, which is a
(Continued)

(51) Int. Cl.
*G02B 27/64* (2006.01)
*G02B 9/60* (2006.01)
(Continued)

(52) U.S. Cl.
CPC .......... *G02B 27/646* (2013.01); *G02B 1/041* (2013.01); *G02B 9/60* (2013.01); *G02B 13/009* (2013.01);
(Continued)

(58) Field of Classification Search
CPC ........ G02B 27/646; G02B 1/041; G02B 9/60; G02B 13/0045; G02B 13/009;
(Continued)

(56) References Cited

U.S. PATENT DOCUMENTS 2,106,752 A 2/1938 Land
2,354,503 A 7/1944 Arthur
(Continued)

FOREIGN PATENT DOCUMENTS

CN 101276415 A 10/2008
CN 201514511 U 6/2010
(Continued)

OTHER PUBLICATIONS

A compact and cost effective design for cell phone zoom lens, Chang et al., Sep. 2007, 8 pages.
(Continued)

*Primary Examiner* — Luong T Nguyen
(74) *Attorney, Agent, or Firm* — Nathan & Associates; Menachem Nathan

(57) ABSTRACT

A dual-aperture zoom camera comprising a Wide camera with a respective Wide lens and a Tele camera with a respective Tele lens, the Wide and Tele cameras mounted directly on a single printed circuit board, wherein the Wide and Tele lenses have respective effective focal lengths $EFL_W$ and $EFL_T$ and respective total track lengths $TTL_W$ and $TTL_T$ and wherein $TTL_W/EFL_W > 1.1$ and $TTL_T/EFL_T < 1.0$. Optionally, the dual-aperture zoom camera may further comprise an optical OIS controller configured to provide a compensation lens movement according to a user-defined zoom factor (ZF) and a camera tilt (CT) through $LMV = CT \cdot EFL_{ZF}$, where $EFL_{ZF}$ is a zoom-factor dependent effective focal length.

8 Claims, 9 Drawing Sheets

Related U.S. Application Data continuation of application No. 16/299,450, filed on Mar. 12, 2019, now Pat. No. 10,620,450, which is a continuation of application No. 15/456,506, filed on Mar. 11, 2017, now Pat. No. 10,288,896, which is a continuation of application No. 14/973,753, filed on Dec. 18, 2015, now Pat. No. 9,599,796, which is a continuation of application No. 14/373,500, filed as application No. PCT/IB2014/062854 on Jul. 4, 2014, now Pat. No. 9,413,972.

(60) Provisional application No. 61/842,987, filed on Jul. 4, 2013.

(51) Int. Cl.
| | | |
|---|---|---|
| *G02B 13/00* | (2006.01) | |
| *G02B 13/02* | (2006.01) | |
| *H04N 5/225* | (2006.01) | |
| *H04N 5/232* | (2006.01) | |
| *H04N 9/097* | (2006.01) | |
| *G02B 1/04* | (2006.01) | |
| *G02B 27/00* | (2006.01) | |
| *G02B 13/18* | (2006.01) | |
| *G02B 9/62* | (2006.01) | |
| *G02B 5/00* | (2006.01) | |
| *G02B 9/64* | (2006.01) | |
| *G02B 9/12* | (2006.01) | |
| *G02B 9/00* | (2006.01) | |
| *H04N 101/00* | (2006.01) | |

(52) U.S. Cl.
CPC ......... *G02B 13/0045* (2013.01); *G02B 13/02* (2013.01); *G02B 27/0025* (2013.01); *H04N 5/2257* (2013.01); *H04N 5/2258* (2013.01); *H04N 5/23296* (2013.01); *H04N 9/097* (2013.01); *G02B 5/005* (2013.01); *G02B 9/00* (2013.01); *G02B 9/12* (2013.01); *G02B 9/62* (2013.01); *G02B 9/64* (2013.01); *G02B 13/00* (2013.01); *G02B 13/002* (2013.01); *G02B 13/004* (2013.01); *G02B 13/18* (2013.01); *H04N 2101/00* (2013.01); *H04N 2201/00* (2013.01); *Y10T 29/4913* (2015.01)

(58) Field of Classification Search
CPC .... G02B 27/0025; G02B 13/02; G02B 5/005; G02B 9/00; G02B 9/12; G02B 9/62; H04N 5/2257; H04N 5/2258; H04N 5/23296; H04N 9/097; H04N 2101/00
See application file for complete search history.

(56) References Cited

U.S. PATENT DOCUMENTS

| | | |
|---|---|---|
| 2,378,170 A | 6/1945 | Aklin |
| 2,441,093 A | 5/1948 | Aklin |
| 3,388,956 A | 6/1968 | Eggert et al. |
| 3,524,700 A | 8/1970 | Eggert et al. |
| 3,558,218 A | 1/1971 | Grey |
| 3,864,027 A | 2/1975 | Harada |
| 3,942,876 A | 3/1976 | Betensky |
| 4,134,645 A | 1/1979 | Sugiyama et al. |
| 4,199,785 A | 4/1980 | McCullough et al. |
| 4,338,001 A | 7/1982 | Matsui |
| 4,465,345 A | 8/1984 | Yazawa |
| 5,000,551 A | 3/1991 | Shibayama |
| 5,005,083 A | 4/1991 | Grage et al. |
| 5,032,917 A | 7/1991 | Aschwanden |
| 5,041,852 A | 8/1991 | Misawa et al. |
| 5,051,830 A | 9/1991 | von Hoessle |
| 5,099,263 A | 3/1992 | Matsumoto et al. |
| 5,248,971 A | 9/1993 | Mandl |
| 5,287,093 A | 2/1994 | Amano et al. |
| 5,394,520 A | 2/1995 | Hall |
| 5,436,660 A | 7/1995 | Sakamoto |
| 5,444,478 A | 8/1995 | Lelong et al. |
| 5,459,520 A | 10/1995 | Sasaki |
| 5,657,402 A | 8/1997 | Bender et al. |
| 5,682,198 A | 10/1997 | Katayama et al. |
| 5,768,443 A | 6/1998 | Michael et al. |
| 5,926,190 A | 7/1999 | Turkowski et al. |
| 5,940,641 A | 8/1999 | McIntyre et al. |
| 5,969,869 A | 10/1999 | Hirai et al. |
| 5,982,951 A | 11/1999 | Katayama et al. |
| 6,101,334 A | 8/2000 | Fantone |
| 6,128,416 A | 10/2000 | Oura |
| 6,147,702 A | 11/2000 | Smith |
| 6,148,120 A | 11/2000 | Sussman |
| 6,169,636 B1 | 1/2001 | Kreitzer |
| 6,208,765 B1 | 3/2001 | Bergen |
| 6,268,611 B1 | 7/2001 | Pettersson et al. |
| 6,549,215 B2 | 4/2003 | Jouppi |
| 6,611,289 B1 | 8/2003 | Yu et al. |
| 6,643,416 B1 | 11/2003 | Daniels et al. |
| 6,650,368 B1 | 11/2003 | Doron |
| 6,654,180 B2 | 11/2003 | Ori |
| 6,680,748 B1 | 1/2004 | Monti |
| 6,693,750 B2 * | 2/2004 | Sato ............... G02B 15/144113 359/687 |
| 6,714,665 B1 | 3/2004 | Hanna et al. |
| 6,724,421 B1 | 4/2004 | Glatt |
| 6,738,073 B2 | 5/2004 | Park et al. |
| 6,741,250 B1 | 5/2004 | Furlan et al. |
| 6,750,903 B1 | 6/2004 | Miyatake et al. |
| 6,778,207 B1 | 8/2004 | Lee et al. |
| 7,002,583 B2 | 2/2006 | Rabb, III |
| 7,015,954 B1 | 3/2006 | Foote et al. |
| 7,038,716 B2 | 5/2006 | Klein et al. |
| 7,187,504 B2 | 3/2007 | Horiuchi |
| 7,199,348 B2 | 4/2007 | Olsen et al. |
| 7,206,136 B2 | 4/2007 | Labaziewicz et al. |
| 7,248,294 B2 | 7/2007 | Slatter |
| 7,256,944 B2 | 8/2007 | Labaziewicz et al. |
| 7,305,180 B2 | 12/2007 | Labaziewicz et al. |
| 7,339,621 B2 | 3/2008 | Fortier |
| 7,346,217 B1 | 3/2008 | Gold, Jr. |
| 7,365,793 B2 | 4/2008 | Cheatle et al. |
| 7,411,610 B2 | 8/2008 | Doyle |
| 7,424,218 B2 | 9/2008 | Baudisch et al. |
| 7,509,041 B2 | 3/2009 | Hosono |
| 7,515,351 B2 | 4/2009 | Chen et al. |
| 7,533,819 B2 | 5/2009 | Barkan et al. |
| 7,564,635 B1 | 7/2009 | Tang |
| 7,619,683 B2 | 11/2009 | Davis |
| 7,643,225 B1 | 1/2010 | Tsai |
| 7,660,049 B2 | 2/2010 | Tang |
| 7,684,128 B2 | 3/2010 | Tang |
| 7,688,523 B2 | 3/2010 | Sano |
| 7,692,877 B2 | 4/2010 | Tang et al. |
| 7,697,220 B2 | 4/2010 | Iyama |
| 7,738,016 B2 | 6/2010 | Toyofuku |
| 7,738,186 B2 | 6/2010 | Chen et al. |
| 7,773,121 B1 | 8/2010 | Huntsberger et al. |
| 7,777,972 B1 | 8/2010 | Chen et al. |
| 7,809,256 B2 | 10/2010 | Kuroda et al. |
| 7,813,057 B2 | 10/2010 | Lin |
| 7,821,724 B2 | 10/2010 | Tang et al. |
| 7,826,149 B2 | 11/2010 | Tang et al. |
| 7,826,151 B2 | 11/2010 | Tsai |
| 7,859,588 B2 * | 12/2010 | Parulski ............... H04N 5/2258 396/79 |
| 7,869,142 B2 | 1/2011 | Chen et al. |
| 7,880,776 B2 | 2/2011 | LeGall et al. |
| 7,898,747 B2 | 3/2011 | Tang |
| 7,916,401 B2 | 3/2011 | Chen et al. |
| 7,918,398 B2 | 4/2011 | Li et al. |
| 7,933,071 B2 * | 4/2011 | Seo ............... G02B 15/145129 359/672 |
| 7,957,075 B2 | 6/2011 | Tang |
| 7,957,076 B2 | 6/2011 | Tang |

(56) References Cited

U.S. PATENT DOCUMENTS

| | | |
|---|---|---|
| 7,957,079 B2 | 6/2011 | Tang |
| 7,961,406 B2 | 6/2011 | Tang et al. |
| 7,964,835 B2 | 6/2011 | Olsen et al. |
| 7,978,239 B2 | 7/2011 | Deever et al. |
| 8,000,031 B1 | 8/2011 | Tsai |
| 8,004,777 B2 | 8/2011 | Souma |
| 8,077,400 B2 | 12/2011 | Tang |
| 8,115,825 B2 | 2/2012 | Culbert et al. |
| 8,149,327 B2 | 4/2012 | Lin et al. |
| 8,149,523 B2 | 4/2012 | Ozaki |
| 8,154,610 B2 | 4/2012 | Jo et al. |
| 8,218,253 B2 | 7/2012 | Tang |
| 8,228,622 B2 | 7/2012 | Tang |
| 8,233,224 B2 | 7/2012 | Chen |
| 8,238,695 B1 | 8/2012 | Davey et al. |
| 8,253,843 B2 | 8/2012 | Lin |
| 8,274,552 B2 | 9/2012 | Dahi et al. |
| 8,279,537 B2 | 10/2012 | Sato |
| 8,363,337 B2 | 1/2013 | Tang et al. |
| 8,390,729 B2 | 3/2013 | Long et al. |
| 8,391,697 B2 | 3/2013 | Cho et al. |
| 8,395,851 B2 | 3/2013 | Tang et al. |
| 8,400,555 B1 | 3/2013 | Georgiev et al. |
| 8,400,717 B2 | 3/2013 | Chen et al. |
| 8,439,265 B2 | 5/2013 | Ferren et al. |
| 8,446,484 B2 | 5/2013 | Muukki et al. |
| 8,451,549 B2 | 5/2013 | Yamanaka et al. |
| 8,467,137 B2 * | 6/2013 | Yonezawa .......... G02B 13/0045 359/764 |
| 8,483,452 B2 | 7/2013 | Ueda et al. |
| 8,503,107 B2 | 8/2013 | Chen et al. |
| 8,514,491 B2 | 8/2013 | Duparre |
| 8,514,502 B2 | 8/2013 | Chen |
| 8,547,389 B2 | 10/2013 | Hoppe et al. |
| 8,553,106 B2 | 10/2013 | Scarff |
| 8,570,668 B2 | 10/2013 | Takakubo et al. |
| 8,587,691 B2 | 11/2013 | Takane |
| 8,619,148 B1 | 12/2013 | Watts et al. |
| 8,718,458 B2 | 5/2014 | Okuda |
| 8,780,465 B2 | 7/2014 | Chae |
| 8,803,990 B2 | 8/2014 | Smith |
| 8,810,923 B2 | 8/2014 | Shinohara |
| 8,854,745 B1 | 10/2014 | Chen |
| 8,896,655 B2 | 11/2014 | Mauchly et al. |
| 8,958,164 B2 | 2/2015 | Kwon et al. |
| 8,976,255 B2 | 3/2015 | Matsuoto et al. |
| 9,019,387 B2 | 4/2015 | Nakano |
| 9,025,073 B2 | 5/2015 | Attar et al. |
| 9,025,077 B2 | 5/2015 | Attar et al. |
| 9,041,835 B2 | 5/2015 | Honda |
| 9,137,447 B2 | 9/2015 | Shibuno |
| 9,185,291 B1 | 11/2015 | Shabtay et al. |
| 9,215,377 B2 | 12/2015 | Sokeila et al. |
| 9,215,385 B2 | 12/2015 | Luo |
| 9,229,194 B2 | 1/2016 | Yoneyama et al. |
| 9,235,036 B2 | 1/2016 | Kato et al. |
| 9,270,875 B2 | 2/2016 | Brisedoux et al. |
| 9,279,957 B2 | 3/2016 | Kanda et al. |
| 9,286,680 B1 | 3/2016 | Jiang et al. |
| 9,344,626 B2 | 5/2016 | Silverstein et al. |
| 9,360,671 B1 | 6/2016 | Zhou |
| 9,369,621 B2 | 6/2016 | Malone et al. |
| 9,413,930 B2 | 8/2016 | Geerds |
| 9,413,972 B2 * | 8/2016 | Shabtay .......... H04N 5/23296 |
| 9,413,984 B2 | 8/2016 | Attar et al. |
| 9,420,180 B2 | 8/2016 | Jin |
| 9,438,792 B2 | 9/2016 | Nakada et al. |
| 9,485,432 B1 | 11/2016 | Medasani et al. |
| 9,488,802 B2 | 11/2016 | Chen et al. |
| 9,568,712 B2 | 2/2017 | Dror et al. |
| 9,578,257 B2 | 2/2017 | Attar et al. |
| 9,618,748 B2 | 4/2017 | Munger et al. |
| 9,678,310 B2 | 6/2017 | Iwasaki et al. |
| 9,681,057 B2 | 6/2017 | Attar et al. |
| 9,723,220 B2 | 8/2017 | Sugie |
| 9,736,365 B2 | 8/2017 | Laroia |
| 9,736,391 B2 | 8/2017 | Du et al. |
| 9,768,310 B2 | 9/2017 | Ahn et al. |
| 9,800,798 B2 | 10/2017 | Ravirala et al. |
| 9,817,213 B2 | 11/2017 | Mercado |
| 9,851,803 B2 | 12/2017 | Fisher et al. |
| 9,894,287 B2 | 2/2018 | Qian et al. |
| 9,900,522 B2 | 2/2018 | Lu |
| 9,927,600 B2 | 3/2018 | Goldenberg et al. |
| 10,288,896 B2 * | 5/2019 | Shabtay .......... G02B 13/02 |
| 11,287,668 B2 * | 3/2022 | Shabtay .......... G02B 27/0025 |
| 2002/0005902 A1 | 1/2002 | Yuen |
| 2002/0030163 A1 | 3/2002 | Zhang |
| 2002/0063711 A1 | 5/2002 | Park et al. |
| 2002/0075258 A1 | 6/2002 | Park et al. |
| 2002/0118471 A1 | 8/2002 | Imoto |
| 2002/0122113 A1 | 9/2002 | Foote |
| 2002/0167741 A1 | 11/2002 | Koiwai et al. |
| 2003/0030729 A1 | 2/2003 | Prentice et al. |
| 2003/0093805 A1 | 5/2003 | Gin |
| 2003/0160886 A1 | 8/2003 | Misawa et al. |
| 2003/0202113 A1 | 10/2003 | Yoshikawa |
| 2004/0008773 A1 | 1/2004 | Itokawa |
| 2004/0012683 A1 | 1/2004 | Yamasaki et al. |
| 2004/0017386 A1 | 1/2004 | Liu et al. |
| 2004/0027367 A1 | 2/2004 | Pilu |
| 2004/0061788 A1 | 4/2004 | Bateman |
| 2004/0141065 A1 | 7/2004 | Hara et al. |
| 2004/0141086 A1 | 7/2004 | Mihara |
| 2004/0240052 A1 | 12/2004 | Minefuji et al. |
| 2005/0013509 A1 | 1/2005 | Samadani |
| 2005/0041300 A1 | 2/2005 | Oshima et al. |
| 2005/0046740 A1 | 3/2005 | Davis |
| 2005/0062346 A1 | 3/2005 | Sasaki |
| 2005/0128604 A1 | 6/2005 | Kuba |
| 2005/0141103 A1 | 6/2005 | Nishina |
| 2005/0157184 A1 | 7/2005 | Nakanishi et al. |
| 2005/0168834 A1 | 8/2005 | Matsumoto et al. |
| 2005/0168840 A1 | 8/2005 | Kobayashi et al. |
| 2005/0185049 A1 | 8/2005 | Iwai et al. |
| 2005/0200718 A1 | 9/2005 | Lee |
| 2005/0270667 A1 | 12/2005 | Gurevich et al. |
| 2006/0054782 A1 | 3/2006 | Olsen et al. |
| 2006/0056056 A1 | 3/2006 | Ahiska et al. |
| 2006/0067672 A1 | 3/2006 | Washisu et al. |
| 2006/0102907 A1 | 5/2006 | Lee et al. |
| 2006/0125937 A1 | 6/2006 | LeGall et al. |
| 2006/0170793 A1 | 8/2006 | Pasquarette et al. |
| 2006/0175549 A1 | 8/2006 | Miller et al. |
| 2006/0187310 A1 | 8/2006 | Janson et al. |
| 2006/0187322 A1 | 8/2006 | Janson et al. |
| 2006/0187338 A1 | 8/2006 | May et al. |
| 2006/0227236 A1 | 10/2006 | Pak |
| 2007/0024737 A1 | 2/2007 | Nakamura et al. |
| 2007/0126911 A1 | 6/2007 | Nanjo |
| 2007/0177025 A1 | 8/2007 | Kopet et al. |
| 2007/0188653 A1 | 8/2007 | Pollock et al. |
| 2007/0189386 A1 | 8/2007 | Imagawa et al. |
| 2007/0229983 A1 | 10/2007 | Saori |
| 2007/0257184 A1 | 11/2007 | Olsen et al. |
| 2007/0285550 A1 | 12/2007 | Son |
| 2008/0017557 A1 | 1/2008 | Witdouck |
| 2008/0024614 A1 | 1/2008 | Li et al. |
| 2008/0025634 A1 | 1/2008 | Border et al. |
| 2008/0030592 A1 | 2/2008 | Border et al. |
| 2008/0030611 A1 | 2/2008 | Jenkins |
| 2008/0056698 A1 | 3/2008 | Lee et al. |
| 2008/0084484 A1 | 4/2008 | Ochi et al. |
| 2008/0106629 A1 | 5/2008 | Kurtz et al. |
| 2008/0117316 A1 | 5/2008 | Orimoto |
| 2008/0129831 A1 | 6/2008 | Cho et al. |
| 2008/0218611 A1 | 9/2008 | Parulski et al. |
| 2008/0218612 A1 | 9/2008 | Border et al. |
| 2008/0218613 A1 | 9/2008 | Janson et al. |
| 2008/0219654 A1 | 9/2008 | Border et al. |
| 2008/0304161 A1 | 12/2008 | Souma |
| 2009/0002839 A1 | 1/2009 | Sato |
| 2009/0086074 A1 | 4/2009 | Li et al. |
| 2009/0109556 A1 | 4/2009 | Shimizu et al. |

(56) References Cited

U.S. PATENT DOCUMENTS

| | | |
|---|---|---|
| 2009/0122195 A1 | 5/2009 | Van Baar et al. |
| 2009/0122406 A1 | 5/2009 | Rouvinen et al. |
| 2009/0122423 A1 | 5/2009 | Park et al. |
| 2009/0128644 A1 | 5/2009 | Camp et al. |
| 2009/0141365 A1 | 6/2009 | Jannard et al. |
| 2009/0219547 A1 | 9/2009 | Kauhanen et al. |
| 2009/0225438 A1 | 9/2009 | Kubota |
| 2009/0252484 A1 | 10/2009 | Hasuda et al. |
| 2009/0295949 A1 | 12/2009 | Ojala |
| 2009/0324135 A1 | 12/2009 | Kondo et al. |
| 2010/0013906 A1 | 1/2010 | Border et al. |
| 2010/0020221 A1 | 1/2010 | Tupman et al. |
| 2010/0060746 A9 | 3/2010 | Olsen et al. |
| 2010/0097444 A1 | 4/2010 | Lablans |
| 2010/0103194 A1 | 4/2010 | Chen et al. |
| 2010/0165131 A1 | 7/2010 | Makimoto et al. |
| 2010/0165476 A1 | 7/2010 | Eguchi |
| 2010/0196001 A1 | 8/2010 | Ryynanen et al. |
| 2010/0238327 A1 | 9/2010 | Griffith et al. |
| 2010/0259836 A1 | 10/2010 | Kang et al. |
| 2010/0277813 A1 | 11/2010 | Ito |
| 2010/0283842 A1 | 11/2010 | Guissin et al. |
| 2010/0321494 A1 | 12/2010 | Peterson et al. |
| 2011/0001838 A1 | 1/2011 | Lee |
| 2011/0058320 A1 | 3/2011 | Kim et al. |
| 2011/0063417 A1 | 3/2011 | Peters et al. |
| 2011/0063446 A1 | 3/2011 | McMordie et al. |
| 2011/0064327 A1 | 3/2011 | Dagher et al. |
| 2011/0080487 A1 | 4/2011 | Venkataraman et al. |
| 2011/0115965 A1 | 5/2011 | Engelhardt et al. |
| 2011/0128288 A1 | 6/2011 | Petrou et al. |
| 2011/0149119 A1 | 6/2011 | Matsui |
| 2011/0157430 A1 | 6/2011 | Hosoya et al. |
| 2011/0164172 A1 | 7/2011 | Shintani et al. |
| 2011/0188121 A1 | 8/2011 | Goring et al. |
| 2011/0229054 A1 | 9/2011 | Weston et al. |
| 2011/0234798 A1 | 9/2011 | Chou |
| 2011/0234853 A1 | 9/2011 | Hayashi et al. |
| 2011/0234881 A1 | 9/2011 | Wakabayashi et al. |
| 2011/0242286 A1 | 10/2011 | Pace et al. |
| 2011/0242355 A1 | 10/2011 | Goma et al. |
| 2011/0249347 A1 | 10/2011 | Kubota |
| 2011/0298966 A1 | 12/2011 | Kirschstein et al. |
| 2012/0026366 A1 | 2/2012 | Golan et al. |
| 2012/0044372 A1 | 2/2012 | Cote et al. |
| 2012/0062780 A1 | 3/2012 | Morihisa |
| 2012/0069235 A1 | 3/2012 | Imai |
| 2012/0069455 A1 | 3/2012 | Lin |
| 2012/0075489 A1 | 3/2012 | Nishihara |
| 2012/0092777 A1 | 4/2012 | Tochigi et al. |
| 2012/0105579 A1 | 5/2012 | Jeon et al. |
| 2012/0105708 A1 | 5/2012 | Hagiwara |
| 2012/0124525 A1 | 5/2012 | Kang |
| 2012/0154547 A1 | 6/2012 | Aizawa |
| 2012/0154614 A1 | 6/2012 | Moriya et al. |
| 2012/0154929 A1 | 6/2012 | Tsai et al. |
| 2012/0196648 A1 | 8/2012 | Havens et al. |
| 2012/0229663 A1 | 9/2012 | Nelson et al. |
| 2012/0229920 A1 | 9/2012 | Otsu et al. |
| 2012/0249815 A1 | 10/2012 | Bohn et al. |
| 2012/0262806 A1 | 10/2012 | Lin et al. |
| 2012/0287315 A1 | 11/2012 | Huang et al. |
| 2012/0320467 A1 | 12/2012 | Baik et al. |
| 2013/0002928 A1 | 1/2013 | Imai |
| 2013/0016427 A1 | 1/2013 | Sugawara |
| 2013/0057971 A1 | 3/2013 | Zhao et al. |
| 2013/0063629 A1 | 3/2013 | Webster et al. |
| 2013/0076922 A1 | 3/2013 | Shihoh et al. |
| 2013/0088788 A1 | 4/2013 | You |
| 2013/0093842 A1 | 4/2013 | Yahata |
| 2013/0094126 A1 | 4/2013 | Rappoport et al. |
| 2013/0113894 A1 | 5/2013 | Mirlay |
| 2013/0135445 A1 | 5/2013 | Dahi et al. |
| 2013/0155176 A1 | 6/2013 | Paripally et al. |
| 2013/0182150 A1 | 7/2013 | Asakura |
| 2013/0201360 A1 | 8/2013 | Song |
| 2013/0202273 A1 | 8/2013 | Ouedraogo et al. |
| 2013/0208178 A1 | 8/2013 | Park |
| 2013/0235224 A1 | 9/2013 | Park et al. |
| 2013/0250150 A1 | 9/2013 | Malone et al. |
| 2013/0258044 A1 | 10/2013 | Betts-Lacroix |
| 2013/0270419 A1 | 10/2013 | Singh et al. |
| 2013/0278785 A1 | 10/2013 | Nomura et al. |
| 2013/0279032 A1 | 10/2013 | Suigetsu et al. |
| 2013/0286488 A1 | 10/2013 | Chae |
| 2013/0301141 A1* | 11/2013 | Ryu ............. G02B 15/144113 359/683 |
| 2013/0321668 A1 | 12/2013 | Kamath |
| 2014/0009631 A1 | 1/2014 | Topliss |
| 2014/0022436 A1 | 1/2014 | Kim et al. |
| 2014/0049615 A1 | 2/2014 | Uwagawa |
| 2014/0092487 A1 | 4/2014 | Chen et al. |
| 2014/0118584 A1 | 5/2014 | Lee et al. |
| 2014/0146216 A1 | 5/2014 | Okumura |
| 2014/0160311 A1 | 6/2014 | Hwang et al. |
| 2014/0192238 A1 | 7/2014 | Attar et al. |
| 2014/0192253 A1 | 7/2014 | Laroia |
| 2014/0204480 A1 | 7/2014 | Jo et al. |
| 2014/0218587 A1 | 8/2014 | Shah |
| 2014/0285907 A1 | 9/2014 | Tang et al. |
| 2014/0293453 A1 | 10/2014 | Ogino et al. |
| 2014/0313316 A1 | 10/2014 | Olsson et al. |
| 2014/0362242 A1 | 12/2014 | Takizawa |
| 2014/0362274 A1 | 12/2014 | Christie et al. |
| 2015/0002683 A1 | 1/2015 | Hu et al. |
| 2015/0042870 A1 | 2/2015 | Chan et al. |
| 2015/0070781 A1 | 3/2015 | Cheng et al. |
| 2015/0092066 A1 | 4/2015 | Geiss et al. |
| 2015/0103147 A1 | 4/2015 | Ho et al. |
| 2015/0116569 A1 | 4/2015 | Mercado |
| 2015/0138381 A1 | 5/2015 | Ahn |
| 2015/0154776 A1 | 6/2015 | Zhang et al. |
| 2015/0162048 A1 | 6/2015 | Hirata et al. |
| 2015/0195458 A1 | 7/2015 | Nakayama et al. |
| 2015/0215516 A1 | 7/2015 | Dolgin |
| 2015/0237280 A1 | 8/2015 | Choi et al. |
| 2015/0242994 A1 | 8/2015 | Shen |
| 2015/0244906 A1 | 8/2015 | Wu et al. |
| 2015/0244942 A1 | 8/2015 | Shabtay et al. |
| 2015/0253532 A1 | 9/2015 | Lin |
| 2015/0253543 A1 | 9/2015 | Mercado |
| 2015/0253647 A1 | 9/2015 | Mercado |
| 2015/0261299 A1 | 9/2015 | Wajs |
| 2015/0271471 A1 | 9/2015 | Hsieh et al. |
| 2015/0281678 A1 | 10/2015 | Park et al. |
| 2015/0286033 A1 | 10/2015 | Osborne |
| 2015/0316744 A1 | 11/2015 | Chen |
| 2015/0334309 A1 | 11/2015 | Peng et al. |
| 2015/0373252 A1 | 12/2015 | Georgiev |
| 2015/0373263 A1 | 12/2015 | Georgiev et al. |
| 2016/0044250 A1 | 2/2016 | Shabtay et al. |
| 2016/0062084 A1 | 3/2016 | Chen et al. |
| 2016/0070088 A1 | 3/2016 | Koguchi |
| 2016/0085089 A1 | 3/2016 | Mercado |
| 2016/0154202 A1 | 6/2016 | Wippermann et al. |
| 2016/0154204 A1 | 6/2016 | Lim et al. |
| 2016/0187631 A1 | 6/2016 | Choi et al. |
| 2016/0212358 A1 | 7/2016 | Shikata |
| 2016/0212418 A1 | 7/2016 | Demirdjian et al. |
| 2016/0241751 A1 | 8/2016 | Park |
| 2016/0291295 A1 | 10/2016 | Shabtay et al. |
| 2016/0295112 A1 | 10/2016 | Georgiev et al. |
| 2016/0301840 A1 | 10/2016 | Du et al. |
| 2016/0306161 A1 | 10/2016 | Harada et al. |
| 2016/0313537 A1 | 10/2016 | Mercado |
| 2016/0341931 A1 | 11/2016 | Liu et al. |
| 2016/0353008 A1 | 12/2016 | Osborne |
| 2016/0353012 A1 | 12/2016 | Kao et al. |
| 2017/0019616 A1 | 1/2017 | Zhu et al. |
| 2017/0070731 A1 | 3/2017 | Darling et al. |
| 2017/0102522 A1 | 4/2017 | Jo |
| 2017/0115471 A1 | 4/2017 | Shinohara |
| 2017/0160511 A1 | 6/2017 | Kim et al. |
| 2017/0187962 A1 | 6/2017 | Lee et al. |

(56) References Cited

U.S. PATENT DOCUMENTS

| | | |
|---|---|---|
| 2017/0214846 A1 | 7/2017 | Du et al. |
| 2017/0214866 A1 | 7/2017 | Zhu et al. |
| 2017/0242225 A1 | 8/2017 | Fiske |
| 2017/0289458 A1 | 10/2017 | Song et al. |
| 2018/0013944 A1 | 1/2018 | Evans et al. |
| 2018/0017844 A1 | 1/2018 | Yu et al. |
| 2018/0024329 A1 | 1/2018 | Goldenberg et al. |
| 2018/0059365 A1 | 3/2018 | Bone et al. |
| 2018/0059379 A1 | 3/2018 | Chou |
| 2018/0120674 A1 | 5/2018 | Avivi et al. |
| 2018/0150973 A1 | 5/2018 | Tang et al. |
| 2018/0176426 A1 | 6/2018 | Wei et al. |
| 2018/0198897 A1 | 7/2018 | Tang et al. |
| 2018/0217475 A1 | 8/2018 | Goldenberg et al. |
| 2018/0224630 A1 | 8/2018 | Lee et al. |
| 2018/0241922 A1 | 8/2018 | Baldwin et al. |
| 2018/0295292 A1 | 10/2018 | Lee et al. |
| 2018/0300901 A1 | 10/2018 | Wakai et al. |
| 2019/0121103 A1 | 4/2019 | Bachar et al. |
| 2019/0170965 A1 | 6/2019 | Shabtay et al. |

FOREIGN PATENT DOCUMENTS

| | | |
|---|---|---|
| CN | 102193162 A | 9/2011 |
| CN | 102739949 A | 10/2012 |
| CN | 102147519 B | 1/2013 |
| CN | 103024272 A | 4/2013 |
| CN | 103841404 A | 6/2014 |
| CN | 104297906 A | 1/2015 |
| CN | 105467563 A | 4/2016 |
| EP | 1536633 A1 | 6/2005 |
| EP | 1780567 A1 | 5/2007 |
| EP | 2523450 A1 | 11/2012 |
| JP | S54157620 A | 12/1979 |
| JP | S59121015 A | 7/1984 |
| JP | S59191146 A | 10/1984 |
| JP | 6165212 A | 4/1986 |
| JP | S6370211 A | 3/1988 |
| JP | 04211230 A | 8/1992 |
| JP | 46059195 A | 3/1994 |
| JP | H07318864 A | 12/1995 |
| JP | 08271976 A | 10/1996 |
| JP | 2002010276 A | 1/2002 |
| JP | 2003298920 A | 10/2003 |
| JP | 2004133054 A | 4/2004 |
| JP | 2004245982 A | 9/2004 |
| JP | 2005099265 A | 4/2005 |
| JP | 2006238325 A | 9/2006 |
| JP | 2007133096 A | 5/2007 |
| JP | 2007219199 A | 8/2007 |
| JP | 2007228006 A | 9/2007 |
| JP | 2007306282 A | 11/2007 |
| JP | 2008076485 A | 4/2008 |
| JP | 2010164841 A | 7/2010 |
| JP | 2010204341 A | 9/2010 |
| JP | 2011085666 A | 4/2011 |
| JP | 2012203234 A | 10/2012 |
| JP | 2013105049 A | 5/2013 |
| JP | 2013106289 A | 5/2013 |
| JP | 2014142542 A | 8/2014 |
| KR | 20070005946 A | 1/2007 |
| KR | 20090058229 A | 6/2009 |
| KR | 20090131805 A | 12/2009 |
| KR | 20100008936 A | 1/2010 |
| KR | 20140135909 A | 5/2013 |
| KR | 20140014787 A | 2/2014 |
| KR | 20140023552 A | 2/2014 |
| KR | 101477178 B1 | 12/2014 |
| KR | 20140144126 A | 12/2014 |
| KR | 20150118012 A | 10/2015 |
| WO | 2000027131 A2 | 5/2000 |
| WO | 2004084542 A1 | 9/2004 |
| WO | 2006008805 A1 | 1/2006 |
| WO | 2010122841 A1 | 10/2010 |
| WO | 2013058111 A1 | 4/2013 |
| WO | 2013063097 A1 | 5/2013 |
| WO | 2014072818 A2 | 5/2014 |
| WO | 2017025822 A1 | 2/2017 |
| WO | 2017037688 A1 | 3/2017 |
| WO | 2018130898 A1 | 7/2018 |

OTHER PUBLICATIONS

Consumer Electronic Optics: How small a lens can be? The case of panomorph lenses, Thibault et al., Sep. 2014, 7 pages.

Optical design of camera optics for mobile phones, Steinich et al., 2012, pp. 51-58 (8 pages).

The Optics of Miniature Digital Camera Modules, Bareau et al., 2006, 11 pages.

Modeling and measuring liquid crystal tunable lenses, Peter P. Clark, 2014, 7 pages.

Mobile Platform Optical Design, Peter P. Clark, 2014, 7 pages.

Boye et al., "Ultrathin Optics for Low-Profile Innocuous Imager", Sandia Report, 2009.

"Cheat sheet: how to understand f-stops", Internet article, Digital Camera World, 2017.

Statistical Modeling and Performance Characterization of a Real-Time Dual Camera Surveillance System, Greienhagen et al., Publisher: IEEE, 2000, 8 pages.

A 3MPixel Multi-Aperture Image Sensor with 0.7 µm Pixels in 011 µm CMOS, Fife et al., Stanford University, 2008, 3 pages.

Dual camera intelligent sensor for high definition 360 degrees surveillance, Scotti et al., Publisher: IEE, Apr. 2005, 8 pages.

Dual-sensor foveated imaging system, Hua et al., Publisher: Optical Society of America, Jan. 20, 2018, 11 pages.

Defocus Video Matting, McGuire et al., Publisher: ACM SIGGRAPH, Jul. 31, 2005, 11 pages.

Compact multi-aperture imaging with high angular resolution, Santacana et al., Publisher: Optical Society of America, 2015, 10 pages.

Multi-Aperture Photography, Green et al., Publisher: Mitsubishi Electric Research Laboratories, Inc., Jul. 2007, 10 pages.

Multispectral Bilateral Video Fusion, Bennett et al., Publisher: IEEE, May 2007, 10 pages.

Super-resolution imaging using a camera array, Santacana et al., Publisher: Optical Society of America, 2014, 6 pages.

Optical Splitting Trees for High-Precision Monocular Imaging, McGuire et al., Publisher: IEEE, 2007, 11 pages.

High Performance Imaging Using Large Camera Arrays, Wilburn et al., Publisher: Association for Computing Machinery, Inc., 2005, 12 pages.

Real-time Edge-Aware Image Processing with the Bilateral Grid, Chen et al., Publisher: ACM SIGGRAPH, 2007, 9 pages.

Superimposed multi-resolution imaging, Carles et al., Publisher: Optical Society of America, 2017, 13 pages.

Viewfinder Alignment, Adams et al., Publisher: EUROGRAPHICS, 2008, 10 pages.

Dual-Camera System for Multi-Level Activity Recognition, Bodor et al., Publisher: IEEE, 6 pages.

Engineered to the task: Why camera-phone cameras are different, Giles Humpston, Publisher: Solid State Technology, Jun. 2009, 3 pages.

* cited by examiner

THIN DUAL-APERTURE ZOOM DIGITAL CAMERA

CROSS REFERENCE TO RELATED APPLICATIONS

This application is a continuation of U.S. patent application Ser. No. 16/812,289 filed Mar. 7, 2020 (now allowed), which was a continuation of U.S. patent application Ser. No. 16/299,450 filed Mar. 12, 2019, now U.S. Pat. No. 10,620,450, which was a continuation of U.S. patent application Ser. No. 15/456,506 filed Mar. 11, 2017, now U.S. Pat. No. 10,288,896, which was a continuation of U.S. patent application Ser. No. 14/973,753 filed Dec. 18, 2015, now U.S. Pat. No. 9,599,796, which was a continuation of U.S. patent application Ser. No. 14/373,500 filed Jul. 21, 2014, now U.S. Pat. No. 9,413,972, which was a 371 application from international application PCT/IB2014/062854 filed Jul. 4, 2014, and is related to and claims priority from U.S. Provisional Patent Application No. 61/842,987 filed Jul. 4, 2013, which is incorporated herein by reference in its entirety.

FIELD

Embodiments disclosed herein relate in general to digital cameras, and more particularly, to thin dual-aperture zoom digital cameras that can be incorporated in a portable electronic product such as a mobile phone.

BACKGROUND

Compact multi-aperture and in particular dual-aperture (also referred to as "dual-lens" or "dual-camera") digital cameras are known. Miniaturization technologies allow incorporation of such cameras in compact portable electronic devices such as tablets and mobile phones (the latter referred to hereinafter generically as "smartphones"), where they provide advanced imaging capabilities such as zoom, see e.g. co-owned PCT patent application No. PCT/IB2013/060356 titled "High-resolution thin multi-aperture imaging systems", which is incorporated herein by reference in its entirety. A two-camera system (exemplarily including a wide-angle (or "Wide") camera and a telephoto (or "Tele") camera) is calibrated in an end product (e.g. in a smartphone) after manufacturing.

System calibration matches Tele and Wide image pixels by capturing in both cameras known objects. This enables faster and more reliable application of fusion between the two cameras, as described in PCT/IB2013/060356. One problem with such cameras may arise from mishaps such as drop impact. The latter may cause a relative movement between the two cameras after system calibration, changing the pixel matching between Tele and Wide images and thus preventing fast reliable fusion of the Tele and Wide images.

Another problem with dual-aperture zoom cameras relates to their height. There is a large difference in the height (also known as total track length or "TTL") of the Tele and Wide cameras. The TTL, see FIG. 1, is defined as the maximal distance between the object-side surface of a first lens element and a camera image sensor plane. In the following, "W" and "T" subscripts refer respectively to Wide and Tele cameras. In most miniature lenses, the TTL is larger than the lens effective focal length (EFL), which has a meaning well known in the art, see FIG. 1. A typical TTL/EFL ratio for a given lens (or lens assembly) is around 1.3. In a single-aperture smartphone camera, EFL is typically 3.5 mm, leading to a field of view of 70-80°. Assuming one wishes to achieve a dual-aperture X2 optical zoom in a smartphone, it would be natural to use $EFL_W=3.5$ mm and $EFL_T=2\times EFL_W=7$ mm. However, without spatial restrictions, the Wide lens will have an $EFL_W=3.5$ mm and a $TTL_W$ of $3.5\times1.3=4.55$ mm, while the Tele lens will have $EFL_T=7$ mm and $TTL_T$ of $7\times1.3=9.1$ mm. The incorporation of a 9.1 mm lens in a smartphone camera would lead to a camera height of around 9.8 mm, which is unacceptable for many smartphone makers. Also the large height difference (approx. 4.55 mm) between the Wide and Tele cameras can cause shadowing and light-blocking problems, see FIG. 2.

A third problem relates to the implementation of standard optical image stabilization (OIS) in a dual-aperture zoom camera. Standard OIS compensates for camera tilt ("CT") by a parallel-to-the image sensor (exemplarily in the X-Y plane) lens movement ("LMV"). Camera tilt causes image blur. The amount of LMV (in mm) needed to counter a given camera tilt depends on the cameras lens EFL, according to the relation LMV=CT*EFL where "CT" is in radians and EFL is in mm Since as shown above a dual-aperture zoom camera may include two lenses with significantly different EFLs, it is impossible to move both lenses together and achieve optimal tilt compensation for both Tele and Wide cameras. That is, since the tilt is the same for both cameras, a movement that will cancel the tilt for the Wide camera will be insufficient to cancel the tilt for the Tele camera. Similarly, a movement that will cancel the tilt for the Tele camera will over-compensate the tilt cancellation for the Wide camera. Assigning a separate OIS actuator to each camera can achieve simultaneous tilt compensation, but at the expense of a complicated and expensive camera system.

SUMMARY

Embodiments disclosed herein refer to thin dual-aperture zoom cameras with improved drop impact resistance, smaller total thickness, smaller TTL difference between Wide and Tele cameras and improved OIS compensation.

In some embodiments there are provided dual-aperture zoom cameras comprising a Wide camera with a respective Wide lens and a Tele camera with a respective Tele lens, the Wide and Tele cameras mounted directly on a single printed circuit board, wherein the Wide and Tele lenses have respective effective focal lengths $EFL_W$ and $EFL_T$ and respective total track lengths $TTL_W$ and $TTL_T$ and wherein $TTL_W/EFL_W>1.1$ and $TTL_T/EFL_T<1.0$.

In some embodiments, a dual-aperture zoom camera disclosed herein further comprises an OIS controller configured to provide a compensation lens movement according to a camera tilt input and a user-defined zoom factor through LMV=CT*$EFL_{ZF}$, wherein $EFL_{ZF}$ is a "zoom-factor dependent EFL".

In some embodiments, the Tele lens is a lens as described in detail in U.S. provisional patent application No. 61/842,987 and in U.S. patent application Ser. No. 14/367,924, titled "Miniature telephoto lens assembly", both of which are incorporated herein by reference in their entirety.

In some embodiments there are provided methods for manufacturing a dual-aperture zoom camera comprising the steps of providing a Wide camera having a Wide lens with an effective focal length $EFL_W$ and a total track length $TTL_W$, providing a Tele camera having a Tele lens with an effective focal length $EFL_T$ and a total track length $TTL_T$, wherein $TTL_W/EFL_W>1.1$ and wherein $TTL_T/EFL_T<1.0$, and mounting the Wide and Tele cameras directly on a single printed circuit board.

In some embodiments, the methods further comprise the step of configuring an OIS controller of the dual-aperture zoom camera to compensate lens movement of the Wide and Tele lenses according to a camera tilt input and a user-defined zoom factor.

BRIEF DESCRIPTION OF THE DRAWINGS

Non-limiting embodiments are herein described, by way of example only, with reference to the accompanying drawings, wherein.

DETAILED DESCRIPTION

Figure 1:
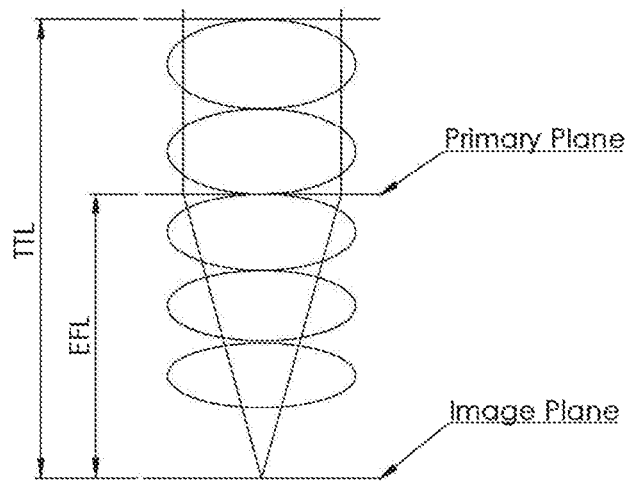
FIG. 1 shows definitions of TTL and EFL.
Figure 2:
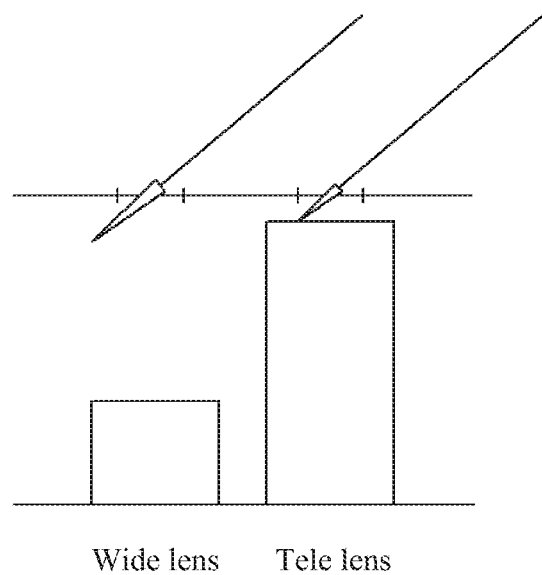
FIG. 2 shows shadowing and light-blocking problems caused by height differences between Wide and Tele cameras in a dual-aperture camera.
Figure 3:
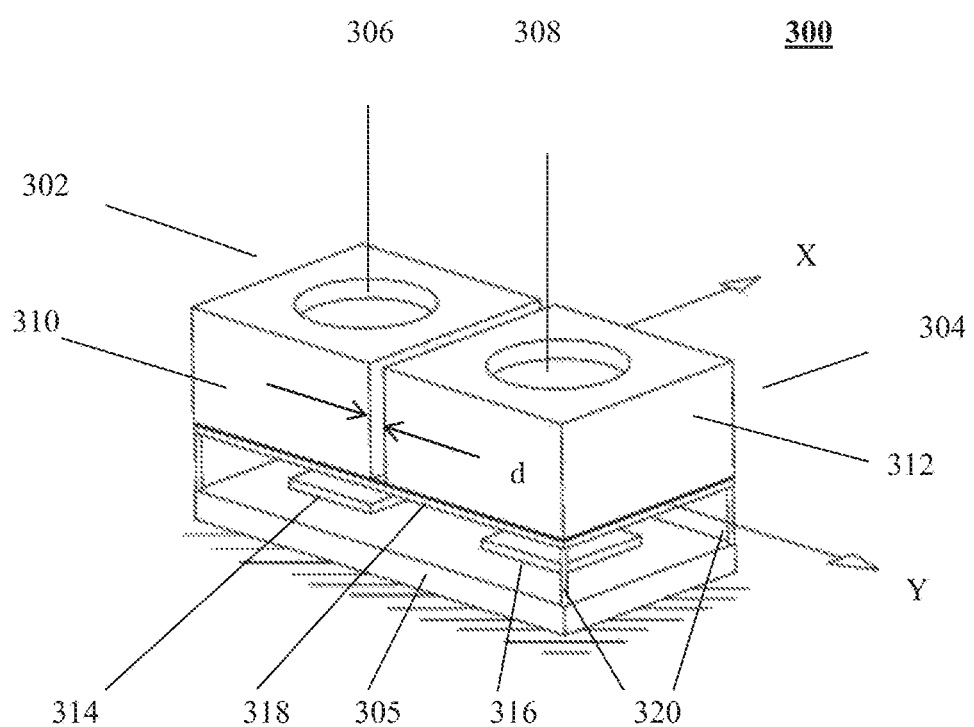
FIG. 3 shows an embodiment of a dual-aperture camera disclosed herein.
Figure 4:
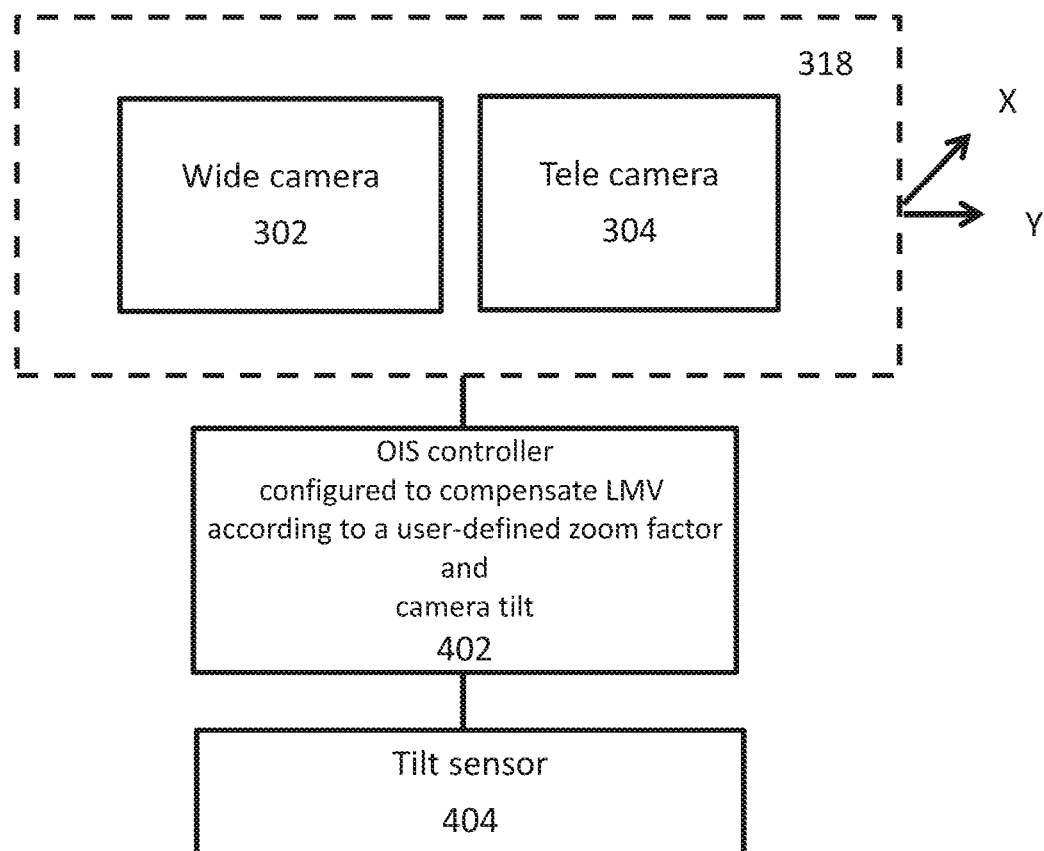
FIG. 4 shows schematically in a block diagram details of the camera embodiment of FIG. 3.

The present inventors have determined that camera movement (due to exemplarily, but not limited to mishaps such as drop impact) can be avoided or minimized by mounting the two cameras directly on a single printed circuit board and by minimizing a distance "d" therebetween. FIG. 3 shows an embodiment of a dual-aperture camera 300 that includes two cameras 302 and 304 mounted directly on a single printed circuit board 305. Each camera includes a lens assembly (respectively 306 and 308), an actuator (respectively 310 and 312) and an image sensor (respectively 314 and 316). The two actuators are rigidly mounted on a rigid base 318 that is flexibly connected to the printed board through flexible elements 320. Base 318 is movable by an OIS mechanism (not shown) controlled by an OIS controller 402 (FIG. 4). The OIS controller is coupled to, and receives camera tilt information from, a tilt sensor (exemplarily a gyroscope) 404 (FIG. 4). More details of an exemplary OIS procedure as disclosed herein are given below with reference to FIG. 4. The two cameras are separated by a small distance "d", typically 1 mm. This small distance between cameras also reduces the perspective effect, enabling smoother zoom transition between cameras.

In some embodiments and optionally, a magnetic shield plate as described in co-owned U.S. patent application Ser. No. 14/365,718 titled "Magnetic shielding between voice coil motors in a dual-aperture camera", which is incorporated herein by reference in its entirety, may be inserted in the gap with width d between the Wide and Tele cameras.

In general, camera dimensions shown in FIG. 3 may be as follows: a length L of the camera (in the Y direction) may vary between 13-25 mm, a width W of the camera (in the X direction) may vary between 6-12 mm, and a height H of the camera (in the Z direction, perpendicular to the X-Y plane) may vary between 4-12 mm More typically in a smartphone camera disclosed herein, L=18 mm, W=8.5 mm and H=7 mm.

The present inventors have further determined that in some embodiments, the problem posed by the large difference in the TTL/EFL ratio of known dual-aperture camera Tele and Wide lenses may be solved through use of a standard lens for the Wide camera ($TTL_W/EFL_W > 1.1$, typically 1.3) and of a special Tele lens design for the Tele camera ($TTL_T/EFL_T < 1$, typically 0.87). Exemplarily, the special Tele lens design may be as described in co-owned U.S. patent application Ser. No. 14/367,924, titled "Miniature telephoto lens assembly", which is incorporated herein by reference in its entirety. A Tele lens assembly described in detail below comprises five lenses that include, in order from an object side to an image side: a first lens element with positive refractive power having a convex object-side surface, a second lens element with negative refractive power having a thickness $d_2$ on an optical axis and separated from the first lens element by a first air gap, a third lens element with negative refractive power and separated from the second lens element by a second air gap, a fourth lens element having a positive refractive power and separated from the third lens element by a third air gap, and a fifth lens element having a negative refractive power, separated from the fourth lens element by a fourth air gap, the fifth lens element having a thickness $d_5$ on the optical axis. The shape (convex or concave) of a lens element surface is defined as viewed from the respective side (i.e. from an object side or from an image side). The lens assembly may exemplarily have a F number (F #)<3.2. In an embodiment, the focal length of the first lens element f1 is smaller than $TTL_T/2$, the first, third and fifth lens elements have each an Abbe number greater than 50, the second and fourth lens elements have each an Abbe number smaller than 30, the first air gap is smaller than $d_2/2$, the third air gap is greater than $TTL_T/5$ and the fourth air gap is smaller than 1.5 $d_5$. In some embodiments, the surfaces of the lens elements may be aspheric.

Figure 5A:
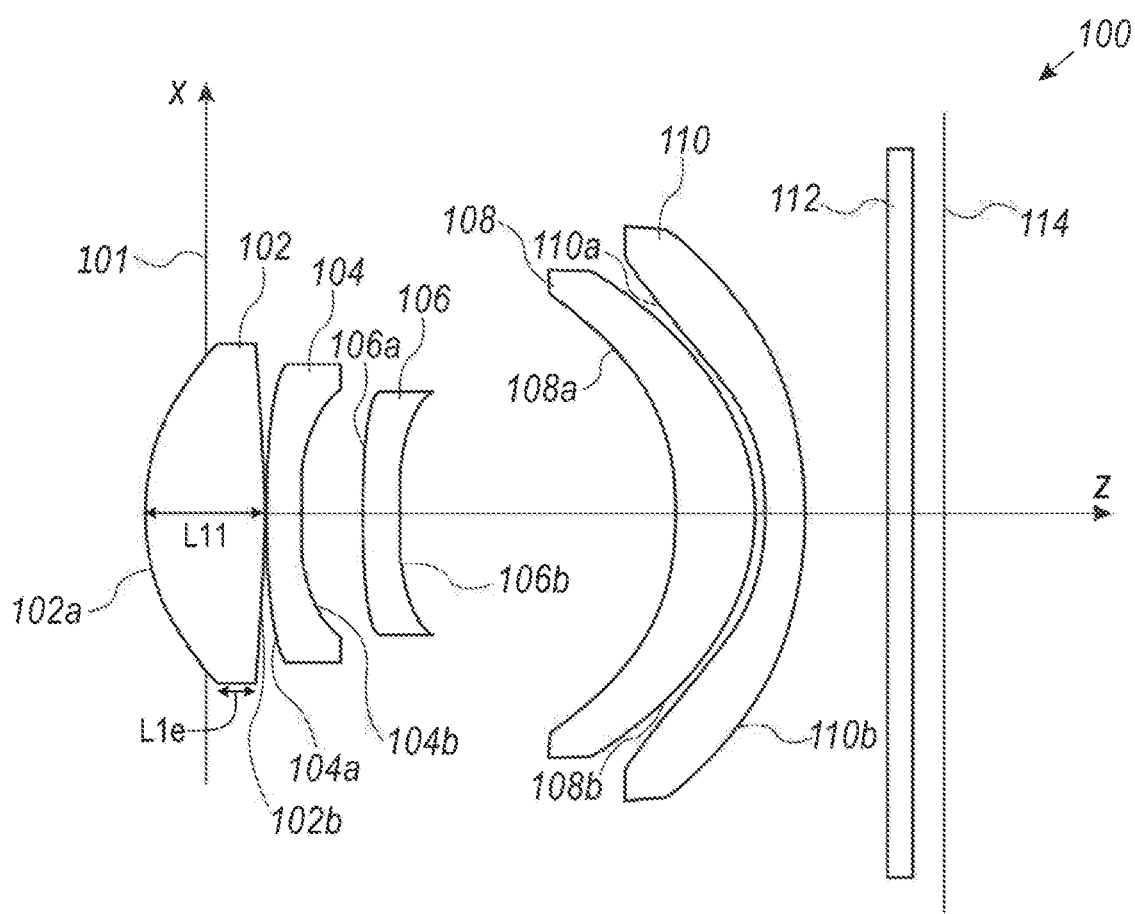
FIG. 5A shows a first embodiment of an optical lens system disclosed herein.
Figure 5B:
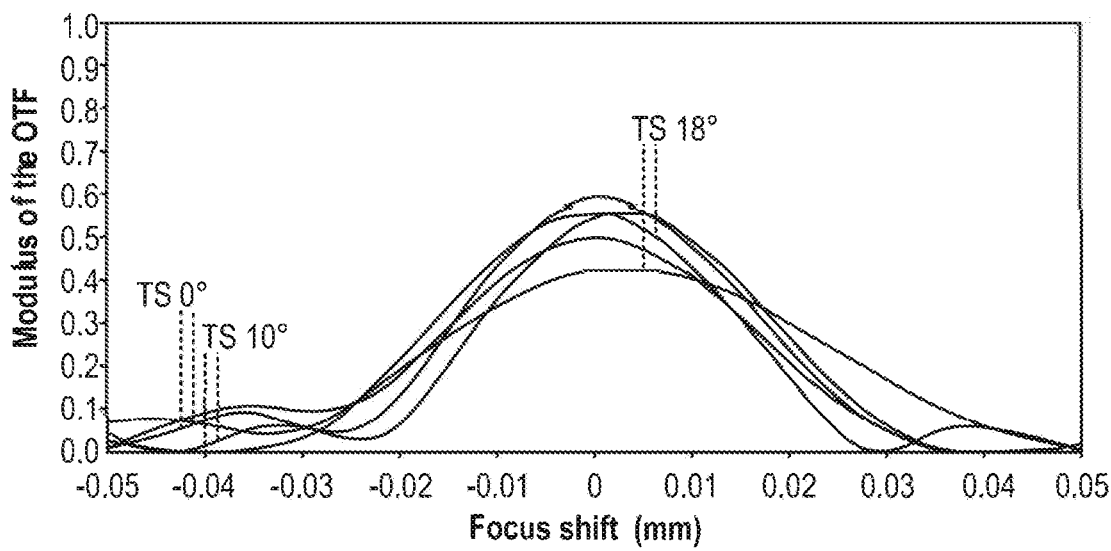
FIG. 5B shows the modulus of the optical transfer function (MTF) vs. focus shift of the entire optical system for various fields in the first embodiment.
Figure 5C:
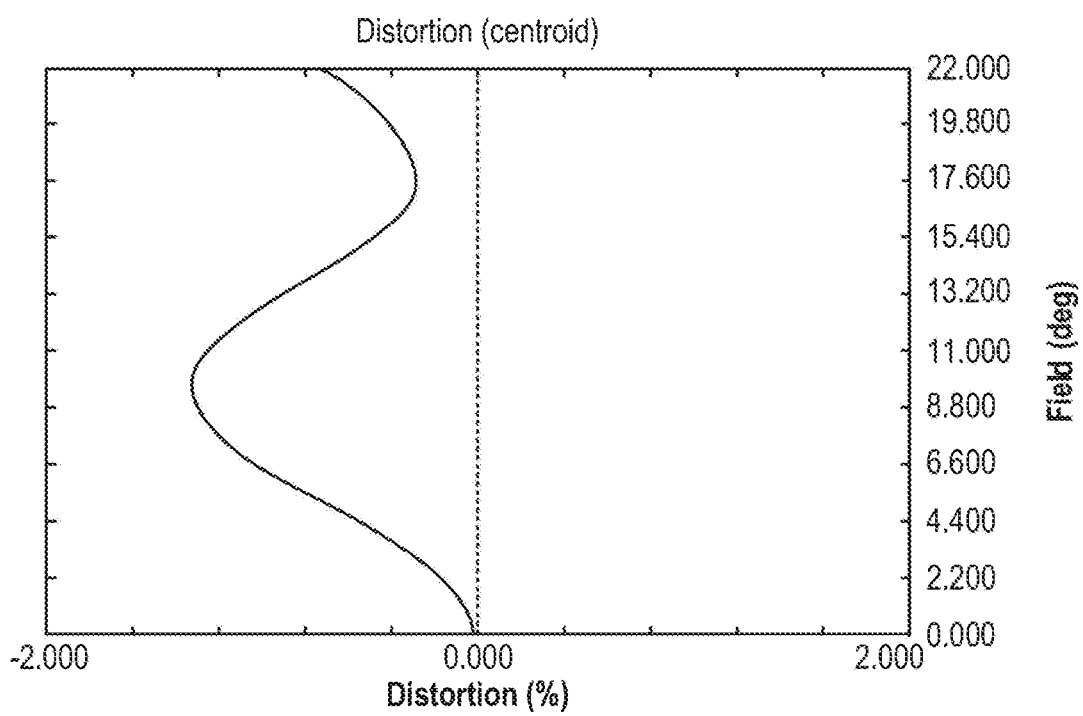
FIG. 5C shows the distortion vs. field angle (+Y direction) in percent in the first embodiment.

FIG. 5A shows a first embodiment of an optical lens system disclosed in incorporated by reference U.S. provisional patent application Ser. No. 14/367,924 and marked 100. FIG. 5B shows the MTF vs. focus shift of the entire optical system for various fields in embodiment 100. FIG. 5C shows the distortion +Y in percent vs. field. Embodiment 100 comprises in order from an object side to an image side: an optional stop 101; a first plastic lens element 102 with positive refractive power having a convex object-side surface 102a and a convex or concave image-side surface 102b; a second plastic lens element 104 with negative refractive power and having a meniscus convex object-side surface 104a, with an image side surface marked 104b; a third plastic lens element 106 with negative refractive power having a concave object-side surface 106a with an inflection point and a concave image-side surface 106b; a fourth plastic lens element 108 with positive refractive power having a positive meniscus, with a concave object-side surface marked 108a and an image-side surface marked 108b; and a fifth plastic lens element 110 with negative refractive power having a negative meniscus, with a concave object-side surface marked 110a and an image-side surface marked 110b. The optical lens system further comprises an optional glass window 112 disposed between the image-side surface 110b of fifth lens element 110 and an image plane 114 for image formation of an object. Moreover, an electronic sensor is disposed at image plane 114 for the image formation.

In embodiment 100, all lens element surfaces are aspheric. Detailed optical data is given in Table 1, and the aspheric surface data is given in Table 2, wherein the units of the radius of curvature (R), lens element thickness and/or distances between elements along the optical axis and diameter are expressed in mm "Nd" is the refraction index. The equation of the aspheric surface profiles is expressed by:

$$z = \frac{cr^2}{1+\sqrt{1-(1+k)c^2r^2}} + \alpha_1 r^2 + \alpha_2 r^4 + \alpha_3 r^6 + \alpha_4 r^8 + \alpha_5 r^{10} + \alpha_6 r^{12} + \alpha_7 r^{14}$$

where r is distance from (and perpendicular to) the optical axis, k is the conic coefficient, c=1/R where R is the radius of curvature, and α are coefficients given in Table 2. In the equation above as applied to embodiments of a lens assembly disclosed in co-owned U.S. patent application Ser. No. 14/367,924, coefficients $\alpha_1$ and $\alpha_7$ are zero. Note that the maximum value of r "max r"=Diameter/2. Also note that Table 1 (and in Tables 3 and 5 below), the distances between various elements (and/or surfaces) are marked "Lmn" (where m refers to the lens element number, n=1 refers to the element thickness and n=2 refers to the air gap to the next element) and are measured on the optical axis z, wherein the stop is at z=0. Each number is measured from the previous surface. Thus, the first distance −0.466 mm is measured from the stop to surface 102a, the distance L11 from surface 102a to surface 102b (i.e. the thickness of first lens element 102) is 0.894 mm, the gap L12 between surfaces 102b and 104a is 0.020 mm, the distance L21 between surfaces 104a and 104b (i.e. thickness d2 of second lens element 104) is 0.246 mm, etc. Also, L21=$d_2$ and L51=$d_5$.

Embodiment 100 provides a field of view (FOV) of 44 degrees, with EFL=6.90 mm, F #=2.80 and TTL of 5.904 mm Thus and advantageously, the ratio TTL/EFL=0.855. Advantageously, the Abbe number of the first, third and fifth lens element is 57.095. Advantageously, the first air gap between lens elements 102 and 104 (the gap between surfaces 102b and 104a) has a thickness (0.020 mm) which is less than a tenth of thickness $d_2$ (0.246 mm). Advantageously, the Abbe number of the second and fourth lens elements is 23.91. Advantageously, the third air gap between lens elements 106 and 108 has a thickness (2.020 mm) greater than TTL/5 (5.904/5 mm). Advantageously, the fourth air gap between lens elements 108 and 110 has a thickness (0.068 mm) which is smaller than $d_5$/2 (0.293/2 mm).

The focal length (in mm) of each lens element in embodiment 100 is as follows: f1=2.645, f2=−5.578, f3=−8.784, f4=9.550 and f5=−5.290. The condition 1.2×|f3|>|f2|>1.5× f1 is clearly satisfied, as 1.2×8.787>5.578>1.5×2.645. f1 also fulfills the condition f1<TTL/2, as 2.645<2.952.

Figure 6A:
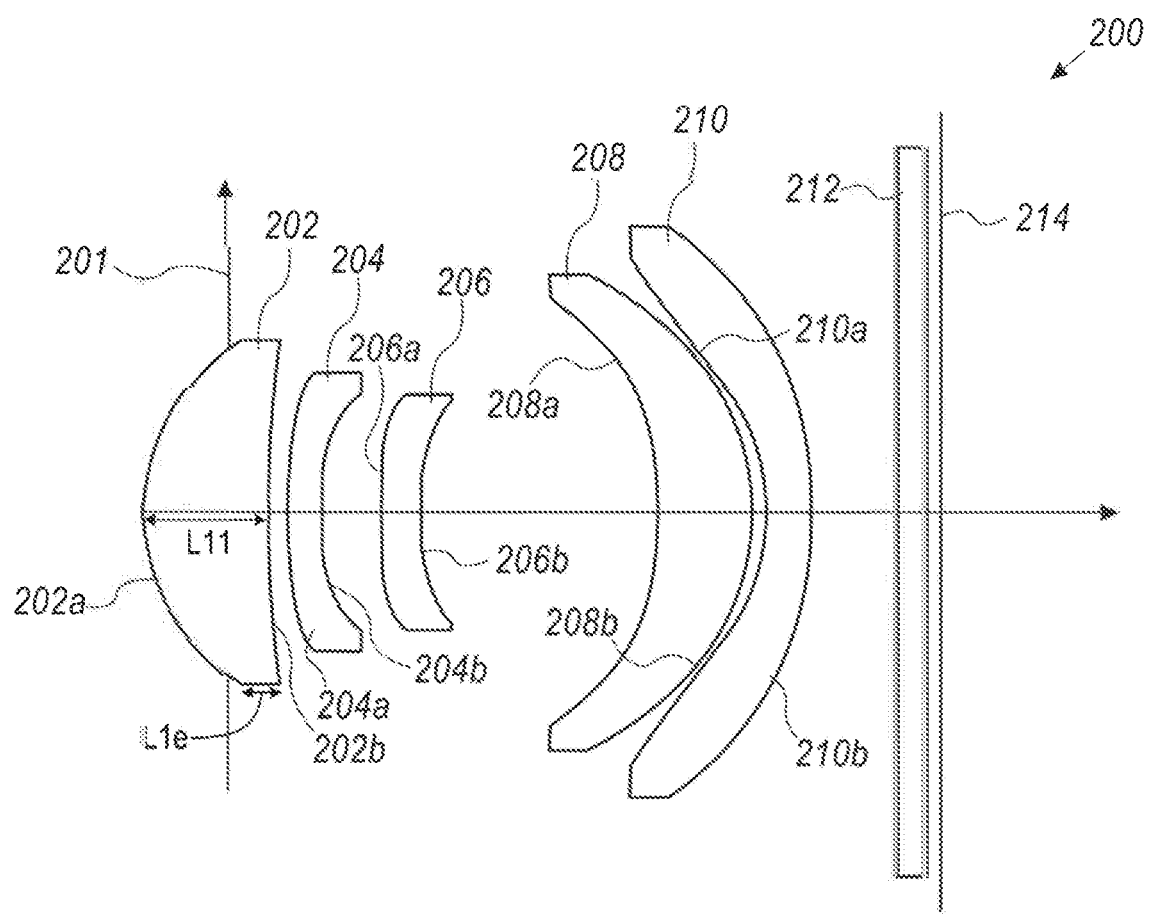
FIG. 6A shows a second embodiment of an optical lens system disclosed herein.
Figure 6B:
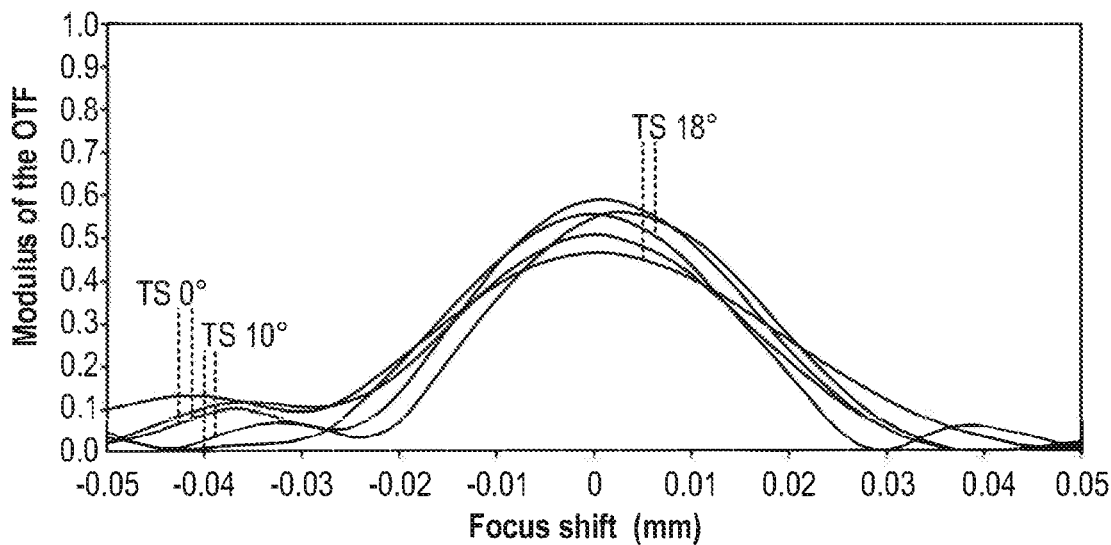
FIG. 6B shows the MTF vs. focus shift of the entire optical system for various fields in the second embodiment.
Figure 6C:
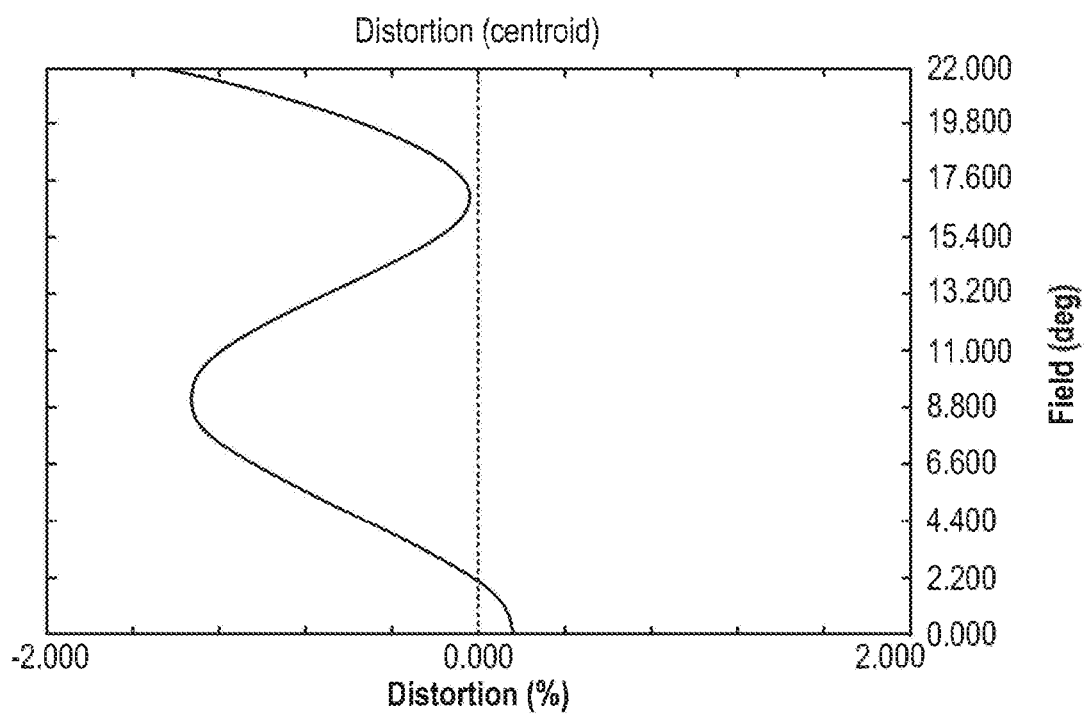
FIG. 6C shows the distortion +Y in percent in the second embodiment.

FIG. 6A shows a second embodiment of an optical lens system disclosed in incorporated by reference U.S. provisional patent application Ser. No. 14/367,924 and marked 200. FIG. 6B shows the MTF vs. focus shift of the entire optical system for various fields in embodiment 200. FIG. 6C shows the distortion +Y in percent vs. field. Embodiment 200 comprises in order from an object side to an image side: an optional stop 201; a first plastic lens element 202 with positive refractive power having a convex object-side surface 202a and a convex or concave image-side surface 202b; a second glass lens element 204 with negative refractive power, having a meniscus convex object-side surface 204a, with an image side surface marked 204b; a third plastic lens element 206 with negative refractive power having a concave object-side surface 206a with an inflection point and a concave image-side surface 206b; a fourth plastic lens element 208 with positive refractive power having a positive meniscus, with a concave object-side surface marked 208a and an image-side surface marked 208b; and a fifth plastic lens element 210 with negative refractive power having a negative meniscus, with a concave object-side surface marked 110a and an image-side surface marked 210b. The optical lens system further comprises an optional glass window 212 disposed between the image-side surface 210b of fifth lens element 210 and an image plane 214 for image formation of an object. Moreover, an electronic sensor is disposed at image plane 214 for the image formation.

In embodiment 200, all lens element surfaces are aspheric. Detailed optical data is given in Table 3, and the aspheric surface data is given in Table 4, wherein the markings and units are the same as in, respectively, Tables

TABLE 1

| # | Comment | Radius R [mm] | Distances [mm] | Nd/Vd | Diameter [mm] |
|---|---|---|---|---|---|
| 1 | Stop | Infinite | −0.466 | | 2.4 |
| 2 | L11 | 1.5800 | 0.894 | 1.5345/57.095 | 2.5 |
| 3 | L12 | −11.2003 | 0.020 | | 2.4 |
| 4 | L21 | 33.8670 | 0.246 | 1.63549/23.91 | 2.2 |
| 5 | L22 | 3.2281 | 0.449 | | 1.9 |
| 6 | L31 | −12.2843 | 0.290 | 1.5345/57.095 | 1.9 |
| 7 | L32 | 7.7138 | 2.020 | | 1.8 |
| 8 | L41 | −2.3755 | 0.597 | 1.63549/23.91 | 3.3 |
| 9 | L42 | −1.8801 | 0.068 | | 3.6 |
| 10 | L51 | −1.8100 | 0.293 | 1.5345/57.095 | 3.9 |
| 11 | L52 | −5.2768 | 0.617 | | 4.3 |
| 12 | Window | Infinite | 0.210 | 1.5168/64.17 | 3.0 |
| 13 | | Infinite | 0.200 | | 3.0 |

TABLE 2

| # | Conic coefficient k | α2 | α3 | α4 | α5 | α6 |
|---|---|---|---|---|---|---|
| 2 | −0.4668 | 7.9218E−03 | 2.3146E−02 | −3.3436E−02 | 2.3650E−02 | −9.2437E−03 |
| 3 | −9.8525 | 2.0102E−02 | 2.0647E−04 | 7.4394E−03 | −1.7529E−02 | 4.5206E−03 |
| 4 | 10.7569 | −1.9248E−03 | 8.6003E−02 | 1.1676E−02 | −4.0607E−02 | 1.3545E−02 |
| 5 | 1.4395 | 5.1029E−03 | 2.4578E−01 | −1.7734E−01 | 2.9848E−01 | −1.3320E−01 |
| 6 | 0.0000 | 2.1629E−01 | 4.0134E−02 | 1.3615E−02 | 2.5914E−03 | −1.2292E−02 |
| 7 | −9.8953 | 2.3297E−01 | 8.2917E−02 | −1.2725E−01 | 1.5691E−01 | −5.9624E−02 |
| 8 | 0.9938 | −1.3522E−02 | −7.0395E−03 | 1.4569E−02 | −1.5336E−02 | 4.3707E−03 |
| 9 | −6.8097 | −1.0654E−01 | 1.2933E−02 | 2.9548E−04 | −1.8317E−03 | 5.0111E−04 |
| 10 | −7.3161 | −1.8636E−01 | 8.3105E−02 | −1.8632E−02 | 2.4012E−03 | −1.2816E−04 |
| 11 | 0.0000 | −1.1927E−01 | 7.0245E−02 | −2.0735E−02 | 2.6418E−03 | −1.1576E−04 |

1 and 2. The equation of the aspheric surface profiles is the same as for embodiment 100.

TABLE 3

| # | Comment | Radius R [mm] | Distances [mm] | Nd/Vd | Diameter [mm] |
|---|---------|---------------|----------------|-------|---------------|
| 1 | Stop | Infinite | −0.592 | | 2.5 |
| 2 | L11 | 1.5457 | 0.898 | 1.53463/56.18 | 2.6 |
| 3 | L12 | −127.7249 | 0.129 | | 2.6 |
| 4 | L21 | 6.6065 | 0.251 | 1.91266/20.65 | 2.1 |
| 5 | L22 | 2.8090 | 0.443 | | 1.8 |
| 6 | L31 | 9.6183 | 0.293 | 1.53463/56.18 | 1.8 |
| 7 | L32 | 3.4694 | 1.766 | | 1.7 |
| 8 | L41 | −2.6432 | 0.696 | 1.632445/23.35 | 3.2 |
| 9 | L42 | −1.8663 | 0.106 | | 3.6 |
| 10 | L51 | −1.4933 | 0.330 | 1.53463/56.18 | 3.9 |
| 11 | L52 | −4.1588 | 0.649 | | 4.3 |
| 12 | Window | Infinite | 0.210 | 1.5168/64.17 | 5.4 |
| 13 | | Infinite | 0.130 | | 5.5 |

TABLE 4

| # | Conic coefficient k | α2 | α3 | α4 | α5 | α6 |
|---|---------------------|-----|-----|-----|-----|-----|
| 2 | 0.0000 | −2.7367E−03 | 2.8779E−04 | −4.3661E−03 | 3.0069E−03 | −1.2282E−03 |
| 3 | −10.0119 | 4.0790E−02 | −1.8379E−02 | 2.2562E−02 | −1.7706E−02 | 4.9640E−03 |
| 4 | 10.0220 | 4.6151E−02 | 5.8320E−02 | −2.0919E−02 | −1.2846E−02 | 8.8283E−03 |
| 5 | 7.2902 | 3.6028E−02 | 1.1436E−01 | −1.9022E−02 | 4.7992E−03 | −3.4079E−03 |
| 6 | 0.0000 | 1.6639E−01 | 5.6754E−02 | −1.2238E−02 | −1.8648E−02 | 1.9292E−02 |
| 7 | 8.1261 | 1.5353E−01 | 8.1427E−02 | −1.5773E−01 | 1.5303E−01 | −4.6064E−02 |
| 8 | 0.0000 | −3.2628E−02 | 1.9535E−02 | −1.6716E−02 | −2.0132E−03 | 2.0112E−03 |
| 9 | 0.0000 | 1.5173E−02 | −1.2252E−02 | 3.3611E−03 | −2.5303E−03 | 8.4038E−04 |
| 10 | −4.7688 | −1.4736E−01 | 7.6335E−02 | −2.5539E−02 | 5.5897E−03 | −5.0290E−04 |
| 11 | 0.00E+00 | −8.3741E−02 | 4.2660E−02 | −8.4866E−03 | 1.2183E−04 | 7.2785E−05 |

Embodiment 200 provides a FOV of 43.48 degrees, with EFL=7 mm, F #=2.86 and TTL=5.90 mm Thus and advantageously, the ratio TTL/EFL=0.843. Advantageously, the Abbe number of the first, third and fifth lens elements is 56.18. The first air gap between lens elements 202 and 204 has a thickness (0.129 mm) which is about half the thickness $d_2$ (0.251 mm). Advantageously, the Abbe number of the second lens element is 20.65 and of the fourth lens element is 23.35. Advantageously, the third air gap between lens elements 206 and 208 has a thickness (1.766 mm) greater than TTL/5 (5.904/5 mm). Advantageously, the fourth air gap between lens elements 208 and 210 has a thickness (0.106 mm) which is less than $d_5/2$ (0.330/2 mm).

The focal length (in mm) of each lens element in embodiment 200 is as follows: f1=2.851, f2=−5.468, f3=−10.279, f4=7.368 and f5=−4.536. The condition 1.2×|f3|>|f2|>1.5×f1 is clearly satisfied, as 1.2×10.279>5.468>1.5×2.851. f1 also fulfills the condition f1<TTL/2, as 2.851<2.950.

Figure 7A:
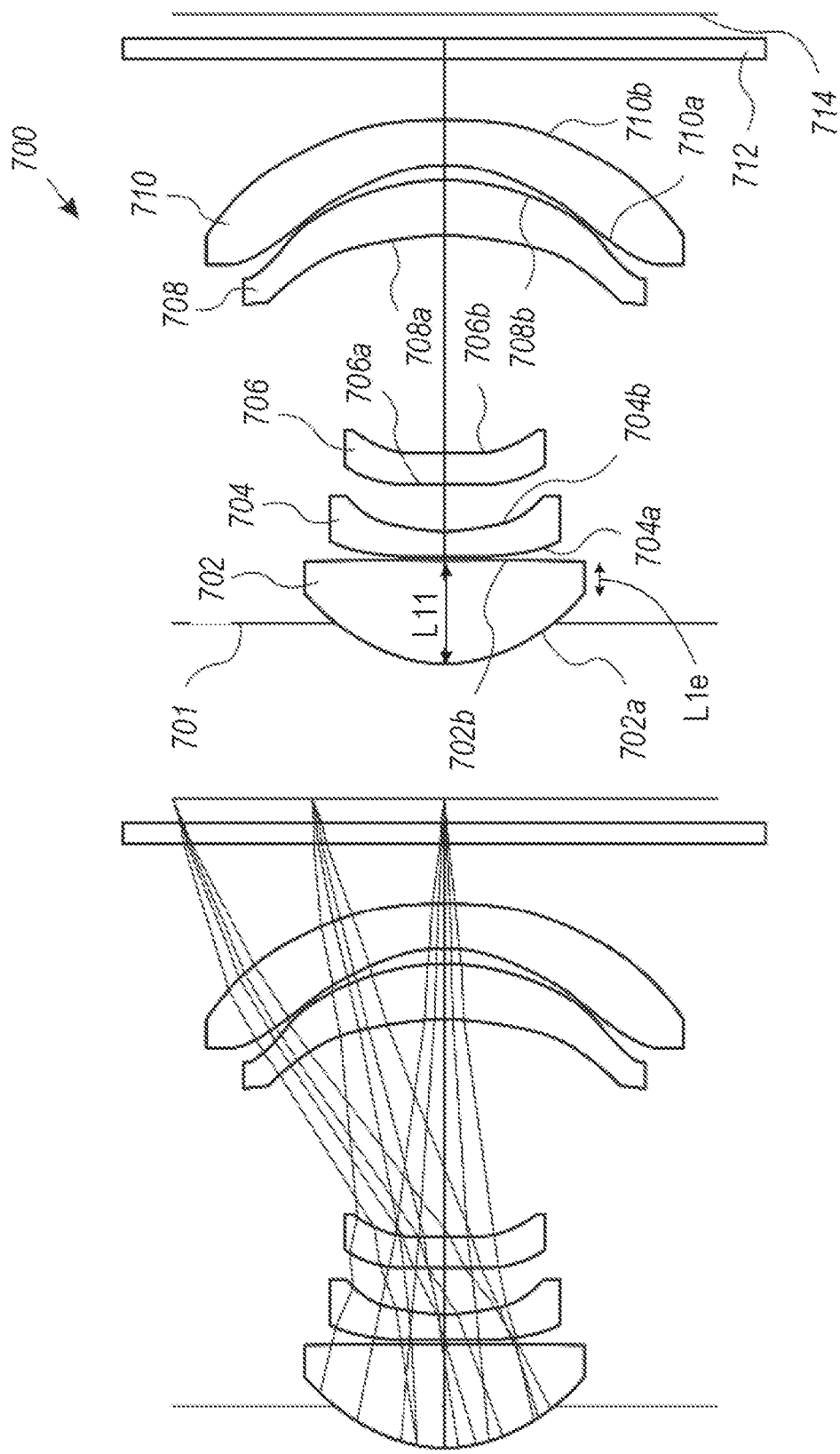
FIG. 7A shows a third embodiment of an optical lens system disclosed herein.
Figure 7B:
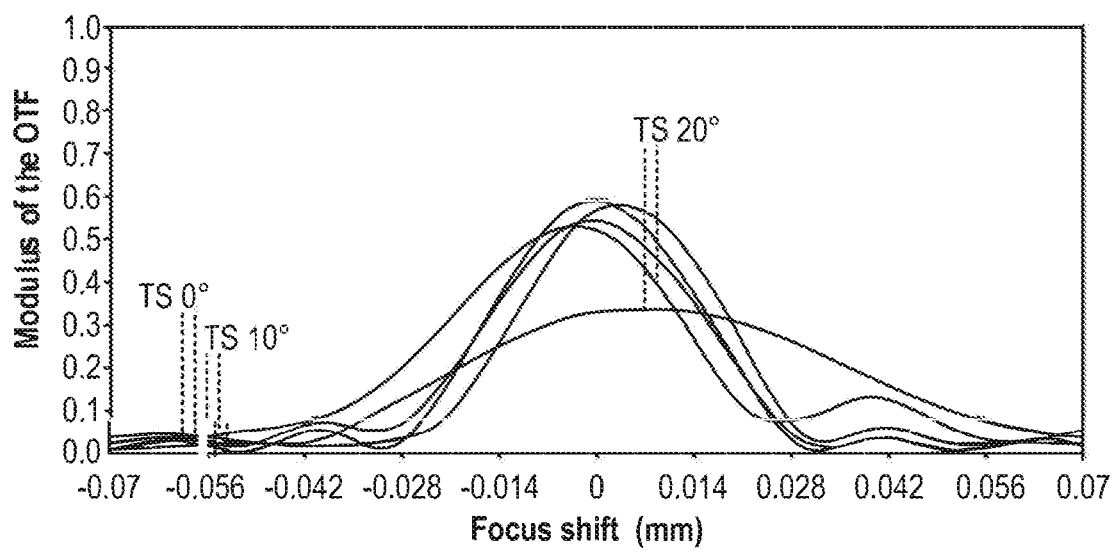
FIG. 7B shows the MTF vs. focus shift of the entire optical system for various fields in the third embodiment.
Figure 7C:
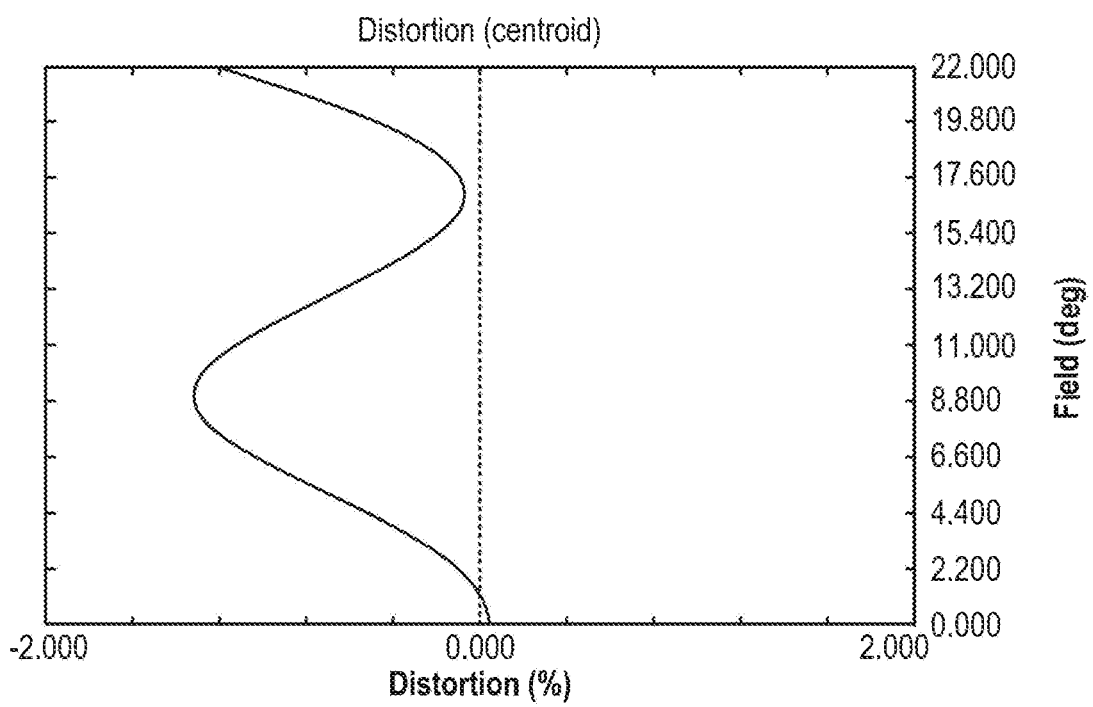
FIG. 7C shows the distortion +Y in percent in the third embodiment.

FIG. 7A shows a third embodiment of an optical lens system disclosed in incorporated by reference U.S. provisional patent application Ser. No. 14/367,924 and marked 700. FIG. 7B shows the MTF vs. focus shift of the entire optical system for various fields in embodiment 700. FIG. 7C shows the distortion +Y in percent vs. field. Embodiment 700 comprises in order from an object side to an image side: an optional stop 701; a first glass lens element 702 with positive refractive power having a convex object-side surface 702a and a convex or concave image-side surface 702b; a second plastic lens element 704 with negative refractive power, having a meniscus convex object-side surface 304a, with an image side surface marked 704b; a third plastic lens element 706 with negative refractive power having a concave object-side surface 706a with an inflection point and a concave image-side surface 706b; a fourth plastic lens element 708 with positive refractive power having a positive meniscus, with a concave object-side surface marked 708a and an image-side surface marked 708b; and a fifth plastic lens element 710 with negative refractive power having a negative meniscus, with a concave object-side surface marked 710a and an image-side surface marked 710b. The optical lens system further comprises an optional glass window 712 disposed between the image-side surface 710b of fifth lens element 710 and an image plane 714 for image formation of an object. Moreover, an electronic sensor is disposed at image plane 714 for the image formation.

In embodiment 700, all lens element surfaces are aspheric. Detailed optical data is given in Table 5, and the aspheric surface data is given in Table 6, wherein the markings and units are the same as in, respectively, Tables 1 and 2. The equation of the aspheric surface profiles is the same as for embodiments 100 and 200.

TABLE 5

| # | Comment | Radius R [mm] | Distances [mm] | Nd/Vd | Diameter [mm] |
|---|---------|---------------|----------------|-------|---------------|
| 1 | Stop | Infinite | −0.38 | | 2.4 |
| 2 | L11 | 1.5127 | 0.919 | 1.5148/63.1 | 2.5 |
| 3 | L12 | −13.3831 | 0.029 | | 2.3 |
| 4 | L21 | 8.4411 | 0.254 | 1.63549/23.91 | 2.1 |
| 5 | L22 | 2.6181 | 0.426 | | 1.8 |
| 6 | L31 | −17.9618 | 0.265 | 1.5345/57.09 | 1.8 |
| 7 | L32 | 4.5841 | 1.998 | | 1.7 |
| 8 | L41 | −2.8827 | 0.514 | 1.63549/23.91 | 3.4 |
| 9 | L42 | −1.9771 | 0.121 | | 3.7 |
| 10 | L51 | −1.8665 | 0.431 | 1.5345/57.09 | 4.0 |
| 11 | L52 | −6.3670 | 0.538 | | 4.4 |
| 12 | Window | Infinite | 0.210 | 1.5168/64.17 | 3.0 |
| 13 | | Infinite | 0.200 | | 3.0 |

TABLE 6

| # | Conic coefficient k | α2 | α3 | α4 | α5 | α6 |
|---|---|---|---|---|---|---|
| 2 | −0.534 | 1.3253E−02 | 2.3699E−02 | −2.8501E−02 | 1.7853E−02 | −4.0314E−03 |
| 3 | −13.473 | 3.0077E−02 | 4.7972E−03 | 1.4475E−02 | −1.8490E−02 | 4.3565E−03 |
| 4 | −10.132 | 7.0372E−04 | 1.1328E−01 | 1.2346E−03 | −4.2655E−02 | 8.8625E−03 |
| 5 | 5.180 | −1.9210E−03 | 2.3799E−01 | −8.8055E−02 | 2.1447E−01 | −1.2702E−01 |
| 6 | 0.000 | 2.6780E−01 | 1.8129E−02 | −1.7323E−02 | 3.7372E−02 | −2.1356E−02 |
| 7 | 10.037 | 2.7660E−01 | −1.0291E−02 | −6.0955E−02 | 7.5235E−02 | −1.6521E−02 |
| 8 | 1.703 | 2.6462E−02 | −1.2633E−02 | −4.7724E−04 | −3.2762E−03 | 1.6551E−03 |
| 9 | −1.456 | 5.7704E−03 | −1.8826E−02 | 5.1593E−03 | −2.9999E−03 | 8.0685E−04 |
| 10 | −6.511 | −2.1699E−01 | 1.3692E−01 | −4.2629E−02 | 6.8371E−03 | −4.1415E−04 |
| 11 | 0.000 | −1.5120E−01 | 8.6614E−02 | −2.3324E−02 | 2.7361E−03 | −1.1236E−04 |

Embodiment 700 provides a FOV of 44 degrees, EFL=6.84 mm, F #=2.80 and TTL=5.904 mm Thus and advantageously, the ratio TTL/EFL=0.863. Advantageously, the Abbe number of the first lens element is 63.1, and of the third and fifth lens elements is 57.09. The first air gap between lens elements 702 and 704 has a thickness (0.029 mm) which is about $1/10^{th}$ the thickness $d_2$ (0.254 mm). Advantageously, the Abbe number of the second and fourth lens elements is 23.91. Advantageously, the third air gap between lens elements 706 and 708 has a thickness (1.998 mm) greater than TTL/5 (5.904/5 mm). Advantageously, the fourth air gap between lens elements 708 and 710 has a thickness (0.121 mm) which is less than $d_5/2$ (0.431/2 mm).

The focal length (in mm) of each lens element in embodiment 700 is as follows: f1=2.687, f2=−6.016, f3=−6.777, f4=8.026 and f5=−5.090. The condition 1.2×|f3|>|f2|>1.5× f1 is clearly satisfied, as 1.2×6.777>6.016>1.5×2.687. f1 also fulfills the condition f1<TTL/2, as 2.687<2.952.

Using a Tele lens designed as above, $TTL_T$ is reduced to 7×0.87=6.09 mm, leading to a camera height of less than 7 mm (acceptable in a smartphone). The height difference (vs. the Wide camera) is also reduced to approximately 1.65 mm, causing less shadowing and light blocking problems.

In some embodiments of a dual-aperture camera disclosed herein, the ratio "e"=$EFL_T/EFL_W$ is in the range 1.3-2.0. In some embodiments, the ratio $TTL_T/TTL_W$<0.8e. In some embodiments, $TTL_T/TTL_W$ is in the range 1.0-1.25. In general, in camera embodiments disclosed herein, $EFL_W$ may be in the range 2.5-6 mm and $EFL_T$ may be in the range 5-12 mm.

With reference now to FIG. 4, in operation, tilt sensor 404 dynamically measures the camera tilt (which is the same for both the Wide and Tele cameras). OIS controller 402, which is coupled to the actuators of both cameras through base 318, receives a CT input from the tilt sensor and a user-defined zoom factor, and controls the lens movement of the two cameras to compensate for the tilt. The LMV is exemplarily in the X-Y plane. The OIS controller is configured to provide a LMV equal to $CT*EFL_{ZF}$, where "$EFL_{ZF}$" is chosen according to the user-defined ZF. In an exemplary OIS procedure, when ZF=1, LMV is determined by the Wide camera $EFL_W$ (i.e. $EFL_{ZF}=EFL_W$ and $LMV=CT*EFL_W$). Further exemplarily, when ZF>e (i.e. ZF>$EFL_T/EFL_W$), LMV is determined by $EFL_T$ (i.e. $EFL_{ZF}=EFL_T$ and $LMV=CT*EFL_T$). Further exemplarily yet, for a ZF between 1 and e, the $EFL_{ZF}$ may shift gradually from $EFL_W$ to $EFL_T$ according to $EFL_{ZF}=ZF*EFL_W$. As mentioned, the OIS procedure above is exemplary, and other OIS procedures may use other relationships between $EFL_{ZF}$ and ZF to provide other type of LMV.

While this disclosure has been described in terms of certain embodiments and generally associated methods, alterations and permutations of the embodiments and methods will be apparent to those skilled in the art. The disclosure is to be understood as not limited by the specific embodiments described herein, but only by the scope of the appended claims.

What is claimed is:

1. A camera system, comprising:
   a) a Wide camera that includes a Wide lens with an effective focal length $EFL_W$ and a total track length $TTL_W$; and
   b) a Tele camera that includes a Tele lens with five lens elements along a Tele lens optical axis and with an effective focal length $EFL_T$, a total track length $TTL_T$ and a F number smaller than 3.2,
   wherein the five lens elements include, in order from an object side to an image side, a first lens element $L_1$ with positive refractive power and a focal length $f_1$, a second lens element $L_2$ with negative refractive power, a third lens element $L_3$, a fourth lens element $L_4$, and a fifth lens element $L_5$, wherein $f_1$ is smaller than $TTL_T/2$, wherein the first, third and fifth lens elements have each an Abbe number greater than 50, wherein the second and fourth lens elements have each an Abbe number smaller than 30,
   wherein the camera system is a dual-aperture zoom camera,
   wherein a ratio e=$EFL_T/EFL_W$ is in the range 1.3-2.0,
   wherein $EFL_W$ is in the range 2.5-6 mm and wherein $EFL_T$ is in the range 5-12 mm,
   and wherein a height difference between the Tele and Wide cameras is equal to or smaller than 1.65 mm.

2. The camera system of claim 1, wherein a ratio $TTL_T/TTL_W$ is smaller than 0.8e.

3. The camera system of claim 1, wherein a height of the dual-aperture zoom camera has a value between 4 mm and 8 mm.

4. The camera system of claim 1, wherein the F number is substantially equal to 2.8.

5. A camera system, comprising:
   a) a Wide camera that includes a Wide lens with an effective focal length $EFL_W$ and a total track length $TTL_W$; and
   b) a Tele camera that includes a Tele lens with five lens elements along a Tele lens optical axis and with an effective focal length $EFL_T$, a total track length $TTL_T$ and a F number smaller than 3.2,
   wherein the five lens elements include, in order from an object side to an image side, a first lens element with positive refractive power, a second lens element with negative refractive power having a thickness $d_2$ on an optical axis and separated from the first lens element by a first air gap, a third lens element with negative refractive power and separated from the second lens element by a second air gap, a fourth lens element with positive refractive power and separated from the third lens element by a third air gap, and a fifth lens element with negative refractive power, separated from the fourth lens element by a fourth air gap, the fifth lens element having a thickness $d_5$ on the optical axis, wherein the camera system is a dual-aperture zoom camera, wherein a ratio $e=EFL_T/EFL_W$ is in the range 1.3-2.0, wherein $EFL_W$ is in the range 2.5-6 mm and wherein $EFL_T$ is in the range 5-12 mm, and wherein a height difference between the Tele and Wide cameras is equal to or smaller than 1.65 mm.

6. The camera system of claim 5, wherein a focal length of the first lens element f1 is smaller than $TTL_T/2$, wherein the first, third and fifth lens elements have each an Abbe number greater than 50, wherein the second and fourth lens elements have each an Abbe number smaller than 30.

7. The camera system of claim 6, wherein the first air gap is smaller than $d_2/2$, wherein the third air gap is greater than $TTL_T/5$ and wherein the fourth air gap is smaller than $1.5d_5$.

8. The camera system of claim 7, wherein the first air gap is smaller than $d_2/2$, wherein the third air gap is greater than $TTL_T/5$ and wherein the fourth air gap is smaller than $1.5d_5$.

* * * * *